United States Patent
Bendak et al.

(10) Patent No.: US 6,965,618 B1
(45) Date of Patent: Nov. 15, 2005

(54) SYSTEM AND METHOD FOR PROGRAMMING THE BIT ERROR RATE OF FRAME SYNCHRONIZATION WORDS IN A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 934 days.

(21) Appl. No.: 09/747,380

(22) Filed: Dec. 22, 2000

(51) Int. Cl.[7] .............................................. H04L 12/56
(52) U.S. Cl. ...................... 370/503; 370/509; 370/512; 370/514
(58) Field of Search .............................. 370/503, 589, 370/514, 509, 512

(56) References Cited

U.S. PATENT DOCUMENTS

| | | | |
|---|---|---|---|
| 5,251,205 A | 10/1993 | Callon et al. | |
| 5,465,252 A | * 11/1995 | Muller | 370/380 |
| 5,490,252 A | 2/1996 | Macera et al. | |
| 5,568,471 A | 10/1996 | Hershey et al. | |
| 5,661,763 A | 8/1997 | Sands | |
| 5,666,108 A | 9/1997 | Duffy | |
| 5,778,000 A | 7/1998 | Dosiere et al. | |
| 5,793,976 A | 8/1998 | Chen et al. | |
| 5,854,699 A | 12/1998 | Olshansky | |
| 5,875,396 A | 2/1999 | Stockton et al. | |
| 5,982,743 A | 11/1999 | Kusano | |
| 6,006,069 A | 12/1999 | Langston | |

* cited by examiner

Primary Examiner—Kenneth Vanderpuye
(74) Attorney, Agent, or Firm—Incaplaw; Terrance A. Meador (57) ABSTRACT

A system and method have been provided for programming synchronization features of a multidimensional digital frame structure. Such a frame structure acts as a digital wrapper, and includes overhead, payload, and forward error correction (FEC) sections. Words in the overhead section are used to synchronize the frame structure. The described invention permits the bit error rate (BER) of the frame synchronization bytes (FSBs) to be made programmable, so that the system and method are flexible for changes in communication protocols. This flexibility also impacts the number, the location, bandwidth, and the value the FSBs.

11 Claims, 5 Drawing Sheets

SYSTEM AND METHOD FOR PROGRAMMING THE BIT ERROR RATE OF FRAME SYNCHRONIZATION WORDS IN A MULTIDIMENSIONAL DIGITAL FRAME STRUCTURE

RELATED APPLICATIONS

This application contains material related to the following commonly assigned copending U.S. patent applications incorporated herein by reference:

Ser. No. 09/746,490 filed 22 Dec. 2000 for "SYSTEM AND METHOD FOR PROGRAMMING THE LOCATION OF FRAME SYNCHRONIZATION WORDS IN A MULTIDIMENSIONAL DIGITAL FRAME STRUCTURE".

Ser. No. 09/745,655 filed 22 Dec. 2000 for "SYSTEM AND METHOD FOR PROGRAMMING THE VALUE OF FRAME SYNCHRONIZATION WORDS IN A MULTIDIMENSIONAL DIGITAL FRAME STRUCTURE".

Ser. No. 09/746,152 filed 22 Dec. 2000 for "SYSTEM AND METHOD FOR PROGRAMMING THE QUANTITY OF FRAME SYNCHRONIZATION WORDS IN A MULTIDIMENSIONAL DIGITAL FRAME STRUCTURE".

Ser. No. 09/745,793 filed 22 Dec. 2000 for "SYSTEM AND METHOD FOR SELECTIVELY BROADCASTING A MULTIDIMENSIONAL DIGITAL FRAME STRUCTURE".

Ser. No. 09/745,774 filed 22 Dec. 2000 for "SYSTEM AND METHOD FOR PROGRAMMING SYNCHRONIZATION CRITERIA IN A MULTIDIMENSIONAL DIGITAL FRAME STRUCTURE".

Ser. No. 09/747,072 filed 22 Dec. 2000 for "SYSTEM AND METHOD FOR PROGRAMMING LOSS OF SYNCHRONIZATION IN A MULTIDIMENSIONAL DIGITAL FRAME STRUCTURE".

Ser. No. 09/746,159 filed 22 Dec. 2000 for "SYSTEM AND METHOD FOR TRANSLATING OVERHEAD BYTES IN A MULTIDIMENSIONAL DIGITAL FRAME STRUCTURE".

Ser. No. 09/527,343, filed 17 Mar. 2000 for "TRANSPOSABLE FRAME SYNCHRONIZATION STRUCTURE".

Ser. No. 09/528,021, filed 17 Mar. 2000 for "PROGRAMMABLE SYNCHRONIZATION STRUCTURE WITH AUXILIARY DATA LINK"

BACKGROUND OF THE INVENTION

1. Field of the Invention

This invention generally relates to digitally wrapped communication formats and, more particularly, to a system and method for programming the selection of frame synchronization word bit error rates in frame structured communication.

2. Description of the Related Art

Frame synchronization is used in most communication technologies where extra bandwidth is required to add functionality into the original data stream. There is no standard practice with respect to the bandwidth allocation of frame synchronization words. Neither is there an ability to customize the use of that bandwidth and synchronization thresholding adaptive to various bit error rate conditions in a variable rate forward error correction (FEC) system implementing interleaved multi-frame superframes.

It would increase bandwidth if all the bytes, or words of a digital frame structure could be devoted to payload. However, a significant portion of the frame is devoted to FEC to remove errors that are introduced in data transmission lines. Even fiber optic systems can be noisy enough to introduce errors, when the distance between nodes is great enough. Part of the frame must also be used for maintenance functions between communication nodes. Further, a portion of the frame must be devoted to synchronization. The synchronization function becomes even more critical when the frames are scrambled to randomize the data density. These maintenance and synchronization bytes reside in the overhead section of the frame. However, as mentioned above, there is no standard protocol defining the number, location, or value of frame synchronization bytes. Hardware devoted to any particular protocol or implementation quickly becomes obsolete. An exclusively software approach to managing communications is cumbersome.

It would be advantageous if communication hardware could be developed that permitted flexibility in defining the frame synchronization bytes, so as to permit the hardware to be used in a number of communication standards.

It would be advantageous if the frame synchronization bytes in a digital frame structure could be made programmable to account for different signal to noise conditions.

It would be advantageous if the bit error rate (BER) of frame synchronization bytes (FSBs) could be made selectable in a multidimensional digital frame structure.

Likewise, it would be advantageous if the quantity, location, and the values of FSBs could be made selectable to accommodate a number of communication standards, or changes to existing standards.

SUMMARY OF THE INVENTION

Accordingly, an integrated circuit communication device is provided that includes programmable features to allocate bandwidth for frame synchronization words and set up the error thresholding, adjusting the robustness to bit errors and the time required to achieve synchronization. More specifically, the device provides for:

a programmable frame synchronization word bandwidth;
programmable frame synchronization words;
different synchronization words with independent allocated bandwidths;
frame synchronization word translation between the decoder and encoder;
frame synchronization word error thresholding for system robustness;
programmable synchronization (in-to-sync) parameters; and
programmable out-of-sync synchronization parameters.

Broadly, this invention describes a structure for programming key features for a frame synchronization system using a multidimensional digital frame. More particularly, an example of the invention is provided in a programmable framing structure for a forward error correction (FEC) encoded channel interleaved to 16 levels with a 4 frame superframe. The structure provides the user the ability to allocate the amount of bandwidth dedicated to the frame synchronization words, to control the speed of synchronization and the robustness to channel noise. As an added benefit, a programmable synchronization threshold can be set to even further increase the robustness to channel noise and to decrease the synchronization time under high bit error rate conditions. These techniques together allow users to increase network security and partitioning as well as to dynamically reallocate the bandwidth occupied for framing based on link conditions without corrupting user data.

Details of the programmable communication IC and a method for variably programming the frame synchronization structure in a multidimensional digital frame structure are provided below.

DETAILED DESCRIPTION OF THE PREFERRED EMBODIMENTS

Figure 1:
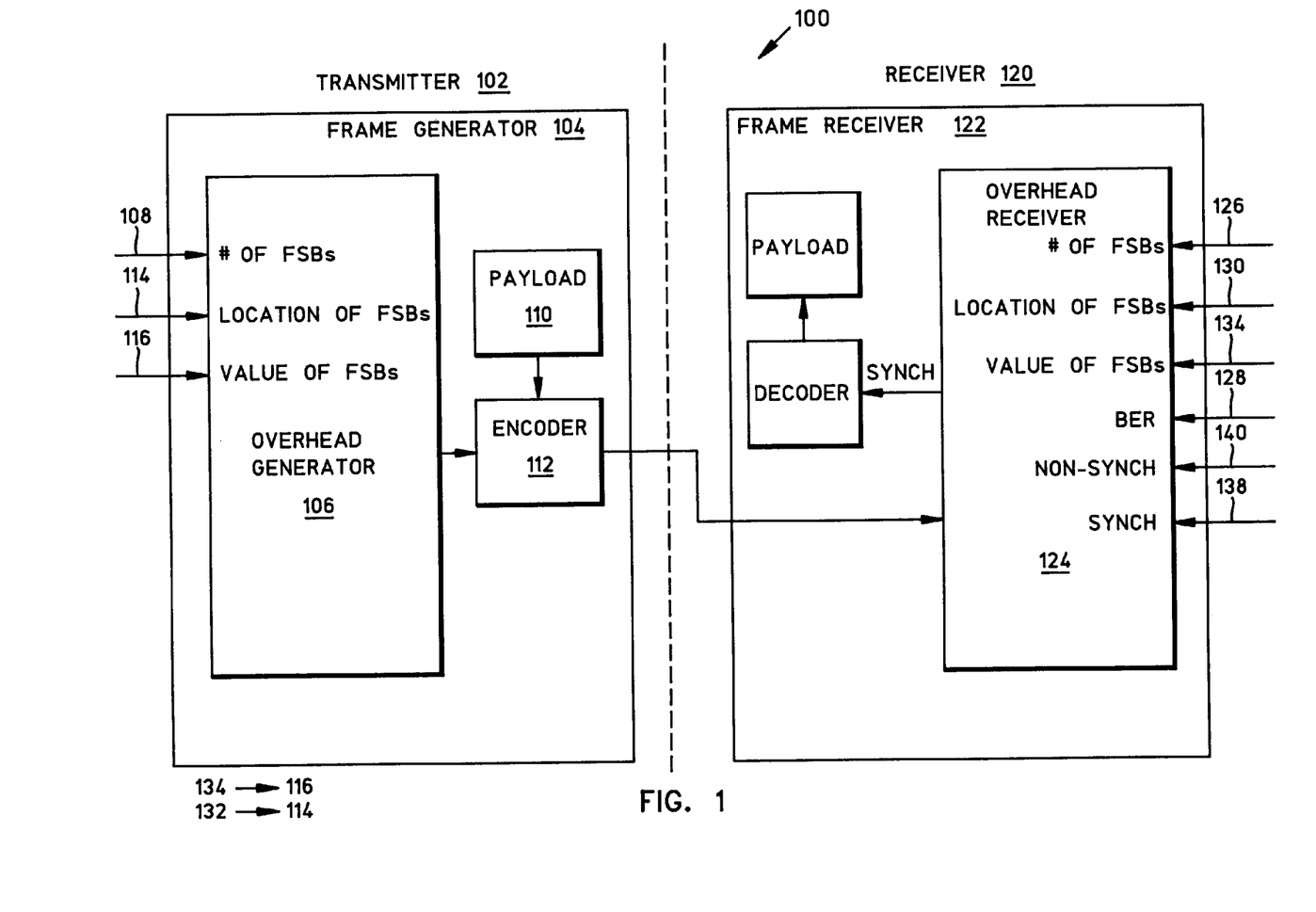
FIG. 1 is a schematic block diagram of a system for variably programming frame synchronization in the communication of a multidimensional digital frame structure.

FIG. 1 is a schematic block diagram of a system for variably programming frame synchronization in the communication of a multidimensional digital frame structure. The system 100 comprises a transmitter 102 with a frame generator 104. The frame generator 104 includes an overhead generator 106 having an input to accept commands on line 108 for selecting the number of synchronization bytes in the overhead section of a frame. A payload generator 110 supplies the information that is to be transmitted. The information can be generated at the transmitter 102, or it can be the payload of a previously received frame. In this case, the transmitter 102 acts as a relay. The frame generator 104 also includes an FEC section, or encoder 112. The encoder codes the payload so that errors due to degradation can be removed at the destination. In some aspects of the invention, parts of the overhead section, or the entire overhead section is encoded, along with the payload. Commands to select FSB locations are accepted on line 114, and commands to select FSB values are accepted on line 116.

Figure 2:
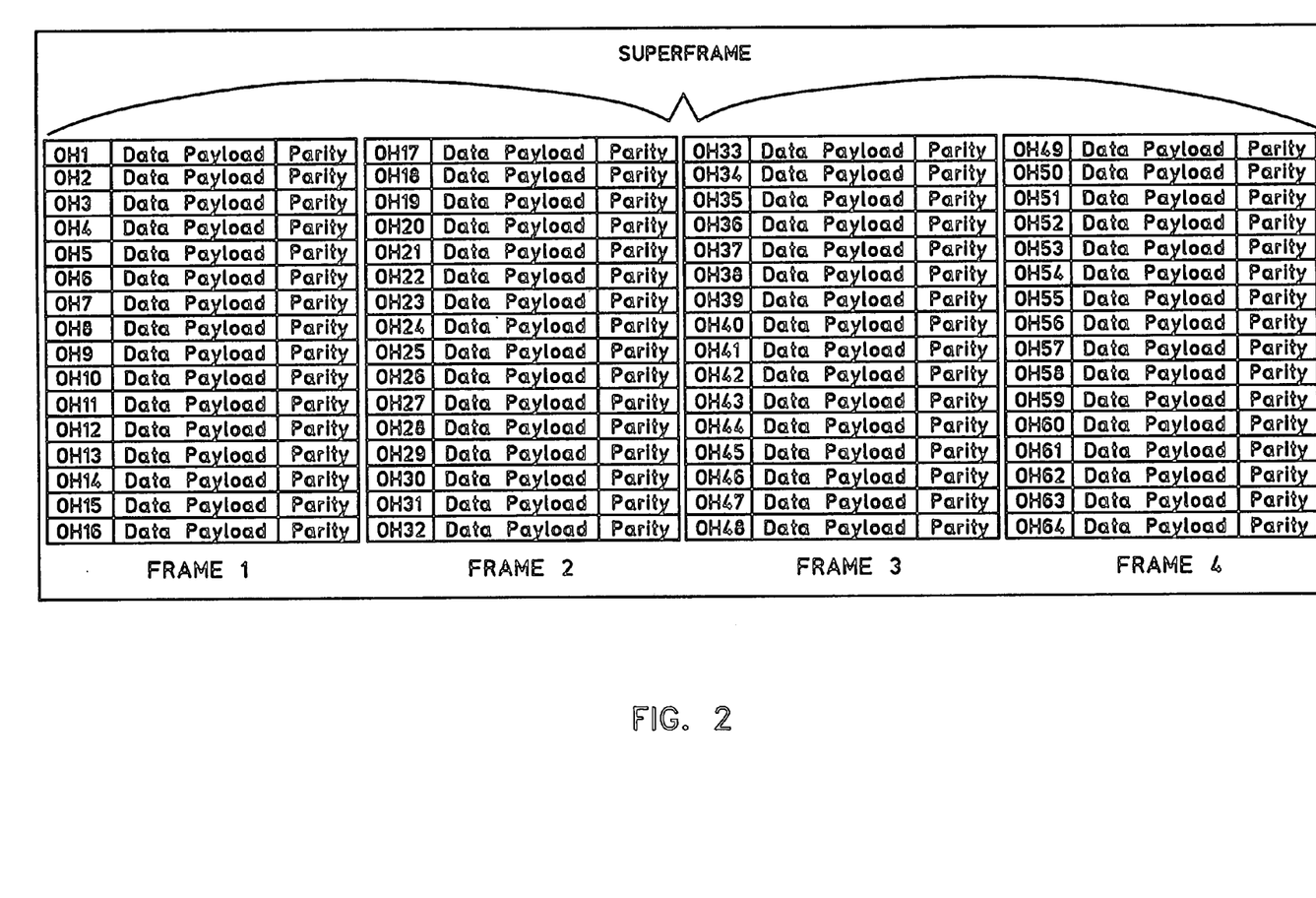
FIG. 2 is a diagram illustrating a multidimensional digital frame structure.

FIG. 2 is a diagram illustrating a multidimensional digital frame structure. As can be seen from examining Frame 1, each frame is considered to be multidimensional because it includes a plurality of rows, where each row includes an overhead byte, payload bytes, and parity (FEC) bytes. The present invention is not limited to any particular number of bytes to the overhead, payload, and FEC sections, or to any particular number of rows.

Returning to FIG. 1, the system 100 includes a receiver 120 with a frame receiver 122. The frame receiver 122 includes an overhead receiver 124 with an input on line 126 to accept commands for selecting the number of frame synchronization bytes for synchronizing the received frame. The overhead receiver 124 synchronizes the frame in response to recognizing the selected frame synchronization bytes. In other aspects of the invention, the frame synchronization function is performed by other elements of the receiver 120 (not shown). Once the FSBs have been identified, synchronization is possible. The frame can be decoded and the payload identified. In some aspects of the invention the receiver 120 is part of a relay, and the payload is relayed as is, or modified before it is retransmitted. Commands to accept FSB bit error rates are accepted on line 128, commands to accept FSB locations are accepted on line 130, and commands to accept FSB values are accepted on line 134.

The frame overhead section includes a first plurality of overhead bytes, in the example of FIG. 2, there are sixteen FSBs per frame, or sixty-four FSBs per superframe. Each overhead byte includes a second plurality of bits. Typically, the second plurality is equal to eight, although the present invention is not limited to any particular number of bits per byte, overhead bytes per frame, or frames per superframe. The overhead receiver 124 selects the bit error rates of the frame synchronization bytes in the range from zero to the second plurality of errors. That is, the error can be represented by a number in the range from zero to eight bits (FF), although a larger, multi-byte number would also be possible.

In general, the invention is oriented to the selection of a bit error rate for the FSBs processed by the overhead receiver 124, however, the concept is equally applicable to any of the bytes in the overhead section. It is also generally true that the bit error rate refers to an average bit error. Typically, the average BER relates to the average BER for FSBs in a frame. For example, the frame receiver 122 receives a frame with an overhead section including a first plurality of frame synchronization bytes. The overhead receiver 124 selects an average bit rate for the first plurality of frame synchronization bytes in each frame. However, the BER can be averaged across the frames of a superframe, or across a plurality of superframes.

In some aspects of the invention, the BER is not averaged. For example, the overhead receiver 124 independently selects a bit error rate for each frame synchronization byte. Alternately, BER can be differentiated by FSB location, value, or quantity.

Other variations of the BER selection concept include selecting a plurality of BERs. For example, the overhead receiver 124 selects a first error rate and a second error rate. In some aspects of the invention, the overhead receiver 124 selects a first error rate in a first frame and a second error rate in a second frame. The multiple BER concept can also be applied to individual FSB in a frame, to different frames in a superframe, or to different superframes. Note that the multiple BER can be averaged BERs, or not.

As noted above, the overhead receiver 124 selects the byte value of the frame synchronization bytes in the overhead section in response to commands on line 134. In some aspects of the invention, the overhead receiver 124 selects a plurality of frame synchronization byte values, and a bit error rate for each of the plurality of frame synchronization values. Otherwise, the overhead receiver 124 selects an average bit error rate for the plurality of frame synchronization values.

The overhead receiver 124 selects the number of frame synchronization bytes in the overhead section in response to commands received on line 126. In some aspects of the invention, the overhead receiver 124 selects an average bit error rate for the selected number of frame synchronization bytes. Otherwise, the overhead receiver 124 selects a plurality of frame synchronization bytes, and a corresponding plurality of bit error rates.

The overhead receiver 124 selects the location of the frame synchronization bytes in the overhead section in response to commands received on line 130. In some aspects of the invention, the overhead receiver 124 selects an average bit error rate for the selected frame synchronization byte locations. Otherwise, the overhead receiver 124 selects a bit error rate for each frame synchronization byte location.

The overhead receiver 124 has an input to accept commands selecting the number of consecutive frames that must be recognized on line 138. The overhead receiver synchronizes the received frame in response to recognizing frame synchronization bytes having a bit error rate less than, or equal to, the selected bit error rate in the selected number of consecutive frames.

Likewise, the overhead receiver 124 has an input on line 140 to accept commands selecting the number of received frames in which frame synchronization bytes are not recognized. The overhead receiver 124 falls out of synchronization in response to the selected number of received frames in which frame synchronization bytes are not recognized.

Returning to FIG. 2, it can be seen that a superframe includes a plurality of frames. Four frames are shown, but the present invention is not limited to any particular number of frames per superframe. Returning to FIG. 1, the frame generator 104 defines a superframe structure with a predetermined number of frames per superframe. Then, the overhead generator 106 selects frame synchronization byte values in the overhead section of each frame of the superframe. Likewise, the overhead receiver 124 recognizes frame synchronization bytes in each frame of the superframe. In some aspects of the invention, the overhead receiver 124 selects the number of frame synchronization bytes required for recognition, for each frame.

In some aspects of the invention, the frame generator 104 forms a superframe consisting of a first, second, third, and fourth frame, and the overhead generator 106 supplies a first frame synchronization byte value for the first frame, a second value for the second frame, a third byte value for the third frame, and a fourth byte value for the fourth frame. The first, second, third, and fourth byte values need not necessarily be different. Also, as explained below, each frame may include more than one FSB value. Typically, however, only the first frame includes FSB bytes, so that the overhead generator selects a second, third, and fourth number of byte values equal to zero. In the simple case, the frame receiver 122 forms a superframe consisting of a first, second, third, and fourth frame, and the overhead receiver 124 selects the first byte value for the first frame, the second byte value for the second frame, the third byte value for the third frame, and the fourth byte value for the fourth frame. Again, it is typical that the overhead receiver 124 selects a second, third, and fourth number of byte values equal to zero.

The overhead receiver 124 also selects the number of consecutive frames that must be recognized on line 138, and synchronizes the received superframe in response to the selected number of recognized frames. For example, the system may require that FSBs in two consecutive frames be identified, before a superframe is recognized. Likewise, the system may require that a plurality of consecutive superframes be recognized before synchronization occurs. In the context of a superframe structure of four frames, the two consecutive frames may be frame one of a first superframe and frame two of a second superframe.

In some aspects of the invention, the overhead receiver 124 selects a number of bytes for each frame of the superframe, and recognizes the selected number of frame synchronization bytes in each frame of the superframe. For example, the overhead receiver 124 selects a first number of byte values for a first frame of the superframe, and synchronizes the first frame by recognizing the first number of byte values in the first frame of the superframe.

In a simple aspect of the invention, the overhead generator 106 selects a first number of frame synchronization byte values in the overhead section of a frame, and the overhead receiver 124 selects the first number of frame synchronization byte values for recognition for the first frame. However, the overhead receiver need not select the all the FSBs that have been supplied by the overhead generator 106. For example, when the overhead generator supplies a first number of frame synchronization byte values for a first frame, the overhead receiver 124 can select a second number of byte values, less than the first number, for the first frame. The overhead receiver synchronizes the received frame in response to recognizing the second number of frame synchronization byte values in the first frame.

Further, the overhead generator 106 can supply a first number of FSBs in a first frame and a second number of FSBs in the second frame. The overhead receiver 124 can synchronize using the first number of FSB values in the first frame and the second number of FSBs in the second frame. However, as explained, the overhead receiver 124 does not require all the FSBs that are generated.

In some aspects of the invention, the overhead receiver 124 accepts commands for selecting the location of the bytes on line 130 to be used for the frame synchronization of received frames. The overhead receiver 124 synchronizes the received frame in response to recognizing frame synchronization bytes in the selected locations. For example, the overhead receiver 124 selects a first number of byte locations, and synchronizes the received frame in response to recognizing frame synchronization bytes in the first number of selected locations.

However, the frame locations can vary between frames, and between superframes. For example, the overhead receiver 124 selects a first number of FSB byte values in a first number of frames and a second number of FSB byte values in a second number of locations. Likewise, a first number of location can be selected in a first frame of the superframe, and a second number of locations in a second frame. The overhead receiver 124 synchronizes the received frame in response to recognizing frame synchronization bytes in the first number of selected locations in the first frame and the second number of selected locations in the second frame. Looking at FIG. 2 momentarily to refine the above-mentioned example, locations OH 1, OH 2, and OH 3 can be selected for the first frame, while locations OH 5, OH 6, and OH 7 can be selected for the second frame. This example would, of course, require the overhead generator 106 to supply FSBs in at least the above-mentioned byte locations.

In a simple aspect of the invention, the overhead generator 106 selects a first number of locations for a first number of frame synchronization bytes, in response to commands on line 132, and the overhead receiver 124 selects the first number of locations for the first number of frame synchronization bytes. However, the overhead receiver need not select all the location provided by the overhead generator 106. For example, the overhead generator 106 selects a first number of locations for a first number of frame synchronization bytes, and the overhead receiver 124 selects a second number of locations for a second number of frame synchronization bytes, less than the first number, and synchronizes the received frame in response to recognizing frame synchronization bytes in the second number of selected locations. Momentarily examining FIG. 2, the overhead generator 106 may supply FSBs in locations OH 1 through OH 6, while the overhead receiver selects locations OH 4 through OH 6 for use.

In some aspects of the invention, the overhead receiver accepts commands for selecting the values of each frame synchronization byte on line 134. The overhead receiver 124 synchronizes the received frame in response to recognizing the values of synchronization bytes. Typically, the FSB word is a byte of eight bits, although the invention is not limited to an FSB word of any particular length. With eight bit values, $2^8$ possible FSB values are possible for every FSB. Likewise, the FSB values may vary inside a frame. If a frame includes a first plurality, i.e., sixteen, overhead bytes, and sixteen FSBs are selected, then each of the sixteen FSBs may be the same byte value. On the other extreme, each FSB byte value may be different, and sixteen FSB values can be used in the frame. Thus, each frame can be synchronized using FSBs having different values.

In one aspect of the invention, the overhead receiver 124 selects first frame synchronization bytes having a first value and second frame synchronization bytes having a second value. Then, the overhead receiver 124 synchronizes the received frame in response to recognizing the first frame synchronization bytes having the first value and the second frame synchronization bytes having the second value. Although an example using two different FSB values is presented above, it is possible to have as many FSBs as there are rows in a frame. Thus, in the frame structure of FIG. 3, each frame could have a first plurality (sixteen in the example of FIG. 2) unique FSB values. Even more FSB values could be used if a greater portion of each row was devoted to the overhead section, at the expense of the payload or FEC sections.

Likewise, the value of the FSBs can change between frames. In some aspects of the invention, the overhead receiver 124 selects a first number of frame synchronization bytes having a first value in a first frame and a second number of frame synchronization bytes having a second value in a second frame, The overhead receiver synchronizes the received frame in response to recognizing the first number of frame synchronization bytes having the first value in the first frame and the second number of frame synchronization bytes having the second value in the second frame.

Alternately, multiple FSB values can be used in multiple frames. For example, the overhead receiver 124 selects a first number of frame synchronization bytes having a first value and a second number of frame synchronization bytes having a second value in a first and second frame. Then, the overhead receiver 124 synchronizes the frame in response to recognizing frame synchronization bytes having the first and second values in the first and second frames. In some aspects of the invention, the first FSB values are located in a first frame, and the second FSB values are located in a second frame.

In a simple aspect of the invention, the overhead generator 106 selects frame synchronization bytes having a first value, in response to commands on line 136, and the overhead receiver 124 selects frame synchronization bytes having the first value. However, the overhead receiver 124 need not select all the FSB values supplied by the overhead generator. For example, the overhead generator 106 selects a first number of frame synchronization bytes having a first value in a first number of locations and a second number of frame synchronization bytes in a second number of locations having a second value. The overhead receiver 124 selects a third number of frame synchronization bytes in a third number of locations, less than the first number, having the first value, and a fourth number of frame synchronization bytes in a fourth number of locations, less than the second number, having the second value. The overhead receiver 124 synchronizes the received frame in response to recognizing the third number of frame synchronization bytes having the first value in the third number of locations, and the fourth number of frame synchronization bytes having the second value in the fourth number of locations.

As mentioned above, the overhead receiver can select the quantity of FSB in each frame. For example, the overhead receiver 124 can select a first number of FSB values in a first frame, and a second number of FSB values in a second frame. Then, synchronization can occur in response to the number of FSB in each frame.

When the overhead receiver is not able to recognize FSBs, synchronization is lost. Once again, the way in which the system loses synchronization is programmable. The overhead receiver 124 accepts commands on line 140 for selecting a number of consecutive non-recognized frames. Then, the overhead receiver 124 falls out of synchronizing in response to the selected number of consecutively non-recognized frames. The ability to select BER is a powerful feature that permits the user to respond to differing communication partners and varying signal to noise ratios. Degrading the selected BER permits the receiver to accept communications from transmitters having uncertain protocols. Also, FSB bytes can be robbed without losing synchronization. Further, a single set of FSB locations or values can be used in situations where a plurality of receivers are expecting a plurality of differing FSB configurations.

Figure 3:
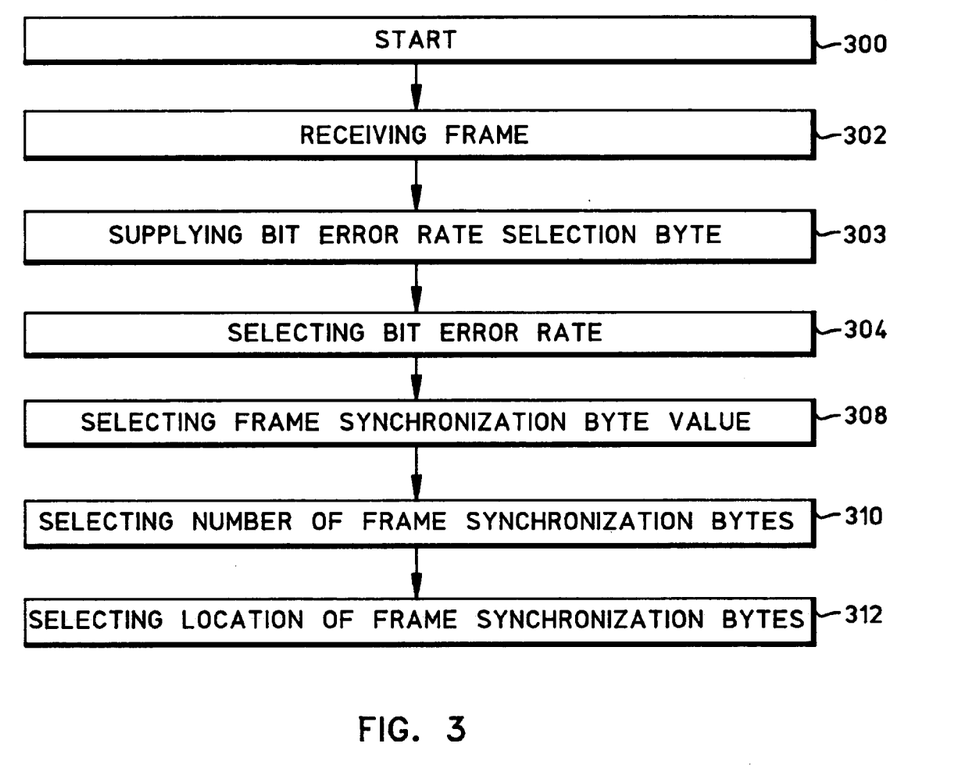
FIG. 3 is a flowchart depicting a method for variably programming the bit error rate of frame synchronization bytes in a multidimensional digital frame structure.

FIG. 3 is a flowchart depicting a method for variably programming the bit error rate of frame synchronization bytes in a multidimensional digital frame structure. Although the method is depicted as a sequence of numbered steps for clarity, no order should be inferred from the numbering unless explicitly stated. The method begins with Step 300. Step 302 receives a frame with an overhead section having a predetermined number of bytes. Step 304 selects the bit error rate for bytes in the overhead section.

In some aspects of the invention, the overhead section includes frame synchronization bytes. Selecting the bit error rate for bytes in the overhead section in Step 304 includes selecting the bit error rate for the frame synchronization bytes.

In some aspects, selecting the bit error rate of the frame synchronization bytes in Step 304 includes selecting an average bit error rate.

In some aspects, receiving a frame in Step 302 includes receiving an overhead section including a first plurality of frame synchronization bytes. Selecting an average bit error rate in Step 304 includes selecting an average bit rate for the first plurality of frame synchronization bytes in each frame.

In some aspects of the invention, receiving a frame in Step 302 includes receiving a plurality of frames in a superframe. Selecting an average bit error rate in Step 304 includes selecting an average bit error rate for the frame synchronization bytes across a span of a superframe.

In some aspects, receiving a frame in Step 302 includes receiving a plurality of frames in a plurality of superframes. Selecting an average bit error rate in Step 304 includes selecting an average bit error rate for the frame synchronization bytes across a span of a plurality of superframes.

Step 303 supplies a bit error rate selection byte with a second plurality of bits. Selecting the bit error rate of the frame synchronization bytes in Step 304 includes selecting a bit error rate responsive to the bit error rate selection byte, in the range from zero to the second plurality of bit values.

In some aspects, selecting the bit error rate of the frame synchronization bytes in Step 304 includes independently selecting a bit error rate for each frame synchronization byte.

In some aspects, selecting the bit error rate for the frame synchronization bytes in Step 304 includes selecting a first error rate and a second error rate.

In some aspects of the invention, selecting the bit error rate for the frame synchronization bytes Step 304 includes selecting a first error rate in a first frame and a second error rate in a second frame.

Step 308 selects the byte value of the frame synchronization bytes in the overhead section. Selecting the value of the frame synchronization bytes in Step 308 includes selecting a second plurality of bits for each frame synchronization byte.

In some aspects of the invention, selecting the value of frame synchronization bytes in Step 308 includes selecting a plurality of frame synchronization byte values. Selecting the bit error rate of the frame synchronization bytes in Step 304 includes selecting a bit error rate for each of the plurality of frame synchronization values.

In some aspects, selecting the value of frame synchronization bytes in Step 308 includes selecting a plurality of frame synchronization byte values. Selecting the bit error rate of the frame synchronization bytes in Step 304 includes selecting an average bit error rate for the plurality of frame synchronization values.

Step 310 selects the number (quantity) of frame synchronization bytes in the overhead section. Selecting the bit error rate of the frame synchronization bytes in Step 304 includes selecting an average bit error rate for the selected number of frame synchronization bytes.

In some aspects, selecting the quantity of bytes in the overhead section in Step 310 includes selecting a plurality of frame synchronization bytes. Selecting the bit error rate of the frame synchronization bytes in Step 304 includes selecting a plurality of bit error rates.

Step 312 selects the location of the frame synchronization bytes in the overhead section. In some aspects, selecting the bit error rate of the frame synchronization bytes in Step 304 includes selecting an average bit error rate for the selected frame synchronization byte locations.

In some aspects, selecting the bit error rate of the frame synchronization bytes in Step 304 includes selecting a bit error rate for each frame synchronization byte location.

Figure 4:
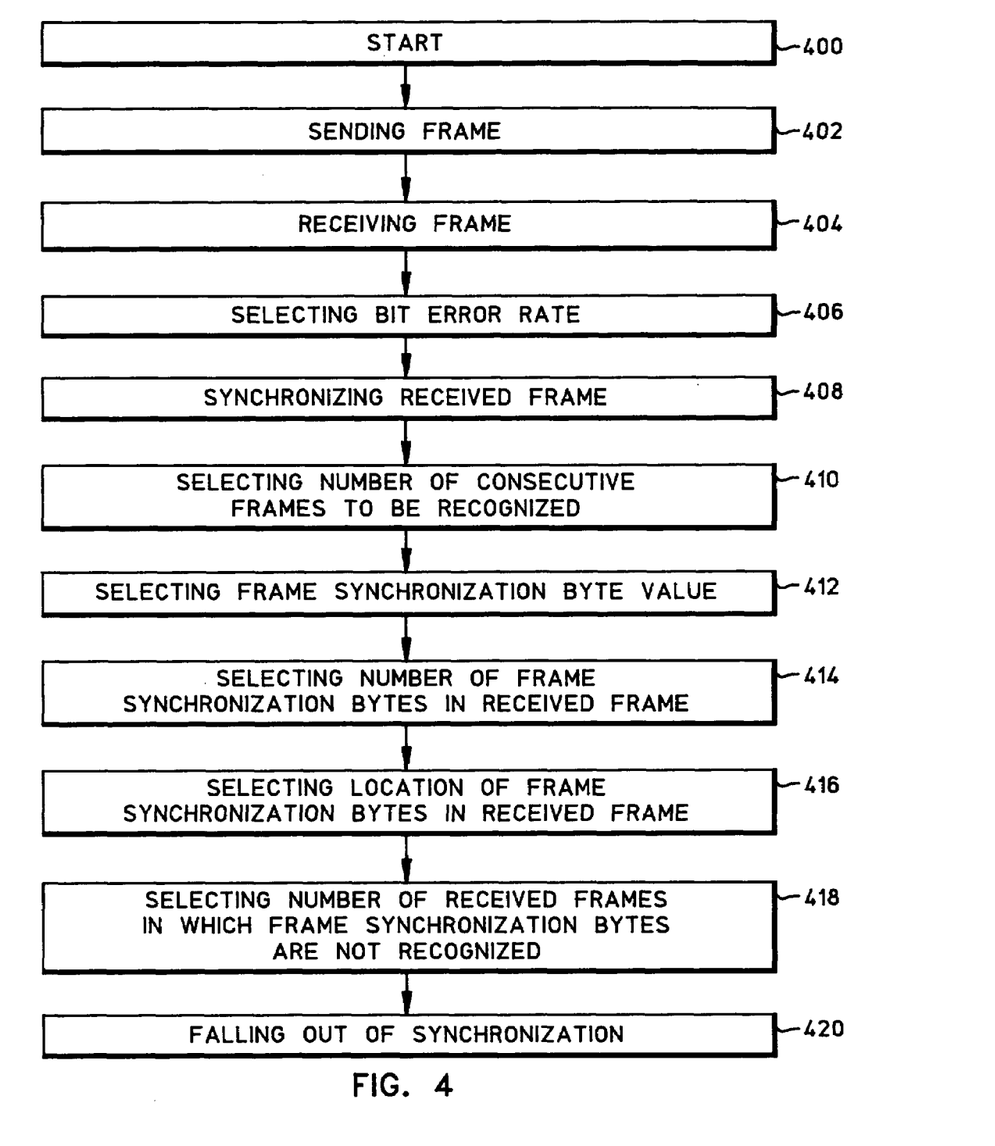
FIG. 4 is a flowchart depicting a method for variably programming the bit error rate of frame synchronization bytes in the communication of a multidimensional digital frame structure.

FIG. 4 is a flowchart depicting a method for variably programming the bit error rate of frame synchronization bytes in the communication of a multidimensional digital frame structure. The method begins with Step 400. Step 402 sends a frame with frame synchronization bytes in the overhead section. Step 404 receives the frame. Step 406 selects the bit error rate required for the recognition of frame synchronization bytes in the received frame. Step 408 synchronizes the received frame in response to recognizing the frame synchronization bytes. In some aspects of the invention, selecting the bit error rate in Step 406 includes selecting an average bit error rate.

Synchronizing the received frame in response to recognizing the frame synchronization byte values in Step 408 includes recognizing frame synchronization bytes having a bit error rate less than, or equal to, the selected bit error rate.

Step 410 selects the number of consecutive frames that must be recognized. Synchronizing the received frame in response to recognizing the frame synchronization bytes in Step 408 includes synchronizing the received frame in response recognizing frame synchronization bytes having a bit error rate less than, or equal to, the selected bit error rate in the selected number of consecutive frames.

In some aspects, sending a frame in Step 402 includes sending a plurality of frames in a superframe. Selecting a bit error rate in Step 406 includes selecting an average bit error rate for the frame synchronization bytes across a span of a superframe, where the span is the number of frames defined as a superframe.

In some aspects, sending a frame in Step 402 includes sending a first frame and a second frame. Selecting the bit error rate in Step 406 includes selecting a first error rate in a first frame and a second error rate in a second frame.

Step 412 selects the byte value of the frame synchronization bytes in the received frame. In some aspects, selecting the byte value of frame synchronization bytes in Step 412 includes selecting a plurality of frame synchronization byte values. Selecting the bit error rate of the frame synchronization bytes in Step 406 includes selecting an average bit error rate for the plurality of frame synchronization values.

Step 414 selects the quantity of frame synchronization bytes in the received frame. In some aspects, selecting the bit error rate of the frame synchronization bytes in Step 406 includes selecting an average bit error rate for the selected number of frame synchronization bytes.

Step 416 selects the location of the frame synchronization bytes in the received frame overhead section. In some aspects, selecting the bit error rate of the frame synchronization bytes in Step 406 includes selecting an average bit error rate for the selected frame synchronization byte locations.

Step 418 selects the number of received frames in which frame synchronization bytes are not recognized. Step 420 falls out of synchronization in response to the selected the number of received frames in which frame synchronization bytes are not recognized.

In some aspects of the invention, selecting the number of received frames in which frame synchronization bytes are not recognized in Step 418 includes selecting the number of frames in which the frame synchronization bytes have a bit error rate greater than the selected bit error rate.

An example of the above, broadly-stated invention is presented below. The typical frame structure uses a 255-byte FEC code as the basic building block which is referred to as a subframe, or row. Each subframe is defined by a Reed-Solomon (RS) codec that is intended to provide 8 byte correction capability over the 255-byte block. This codec is referred to as RS(255, 239) for 8 byte correction.

Figure 5:
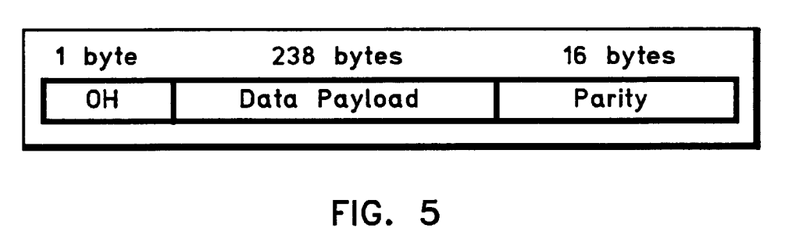
FIG. 5 is an example of a subframe consisting of a 255-byte RS(255, 239) block with an overhead (OH) byte as the first byte, followed by 238 user payload bytes, and 16 bytes of RS parity.

FIG. 5 is an example of a subframe consisting of a 255-byte RS(255, 239) block with an overhead (OH) byte as the first byte, followed by 238 user payload bytes, and 16 bytes of RS parity. The OH byte may be used as an FSB or other programmable function.

Figure 6:
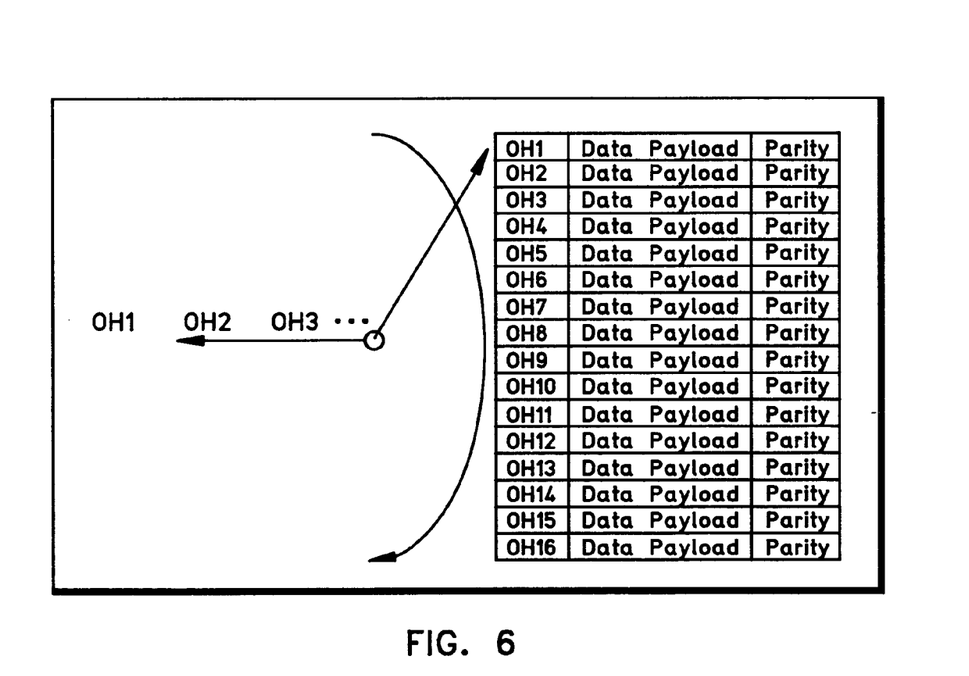
FIG. 6 illustrates the stacking of subframes in a frame.

FIG. 6 illustrates the stacking of subframes in a frame. The subframes are stacked in a structure that is 16 deep to create a frame as shown in FIG. 2. The bytes are transmitted in an interleaved fashion from top to bottom and left to right. Four frames are used to create a superframe as shown in FIG. 2. A superframe contains 64 overhead locations. The frames are transmitted in order from frame 1 to frame 4.

The first frame in the superframe is the one that traditionally contains frame synchronization bytes. The user may select to have two different FSB types (FSB1 and FSB2). The ability to have two different FSBs and the ability to program them with custom values provide the user added control over their system both in terms of resistance to false synchronization and the ability to distinguish different data sources from each other. This is useful when there are multiple wavelengths that can be received, all carrying the same frame structure, but only one of which is allowed/permissioned to be received at a particular node. Table 1 provides an example of how the FSB types are defined.

TABLE 1

Frame Synchronization Byte Definitions

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | | | FSB 2 | | | | | | | | | FSB 1 | | | | |
| Mode | rw | rw | rw | rw | rw | rw | rw | rw | rw | rw | rw | rw | rw | rw | rw | rw |
| Default | 0 | 0 | 1 | 0 | 1 | 0 | 0 | 0 | 1 | 1 | 1 | 1 | 0 | 1 | 1 | 0 |

| Bit Positions | Function | Description |
|---|---|---|
| 15:8 | FSB 2 | Frame Synchronization Byte 2 (Default value = 28h) |
| 7:0 | FSB 1 | Frame Synchronization Byte 1 (Default value = F6h) |

Accommodations are made for two separate frame synchronization bytes.

The FSBs are also programmable in number. In Frame 1, OH 1 to OH 16 can be programmed to be FSB1, FSB2, or a non-FSB function. This expands on the variability afforded by having two different FSBs. By using more of the available bandwidth for FSBs, the user decreases the chance of false synchronization and in general, decreases the amount of time required to acquire synchronization. The user can customize this parameter to optimize for specific requirements and link conditions.

Table 2 demonstrates the structure required to indicate which OH bytes are used for FSBs and Table 3 illustrates the structure that sets whether to use FSB1 or FSB2. The FSB programmability exists independently in both the transmit and receive portions of the device. In the receive section of the device, the number of recognized consecutive FSB groups required to declare synchronization is programmable, as well as the number of bad consecutive FSB groups required to lose synchronization. This is the first level of thresholding for adjusting the tolerance to bit error rate and the amount of time required to declare synchronization. Table 4 is an example of synchronization parameter setting.

The fewer consecutive FSB groups required to achieve synchronization, the shorter the acquisition time. The more consecutive bad FSB groups required to lose synchronization, the greater the system tolerance of higher bit error rates.

The second level of thresholding is to define what is considered a good group of FSBs vs. a bad group of FSBs. This is done by specifying the number of errors that are allowed within a group of FSBs and still be considered good as shown in Table 4. This feature has the advantage of decreasing synchronization time in the presence of high bit error rates. Longer FSB groups are permitted which decrease the probability of false synchronization, without incurring the penalty of difficult synchronization in the presence of noise. Further, the FEC code is given greater opportunity to correct errors.

Another benefit of the second level of thresholding is the ability to dynamically customize the values of the FSBs. This thresholding provides network security, and dynamically allocates more bytes for synchronization based on the link conditions, without causing a resynchronization to occur.

TABLE 2

Frame Synchronization Byte Locations Register

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH #1 | OH #2 | OH #3 | OH #4 | OH #5 | OH #6 | OH #7 | OH #8 | OH #9 | OH #10 | OH #11 | OH #12 | OH #13 | OH #14 | OH #15 | OH #16 |
| Mode | rw | rw | rw | rw | rw | rw | rw | rw | rw | rw | rw | rw | rw | rw | rw | rw |
| Default | 1 | 1 | 1 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: Not a Frame Synchronization Byte<br>1: Frame Synchronization Byte (FSB) (Default) |
| 14 | OH#2 | 0: Not a Frame Synchronization Byte<br>1: Frame Synchronization Byte (FSB) (Default) |
| 13 | OH#3 | 0: Not a Frame Synchronization Byte<br>1: Frame Synchronization Byte (FSB) (Default) |
| 12 | OH#4 | 0: Not a Frame Synchronization Byte<br>1: Frame Synchronization Byte (FSB) (Default) |
| 11 | OH#5 | 0: Not a Frame Synchronization Byte<br>1: Frame Synchronization Byte (FSB) (Default) |
| 10 | OH#6 | 0: Not a Frame Synchronization Byte<br>1: Frame Synchronization Byte (FSB) (Default) |
| 9 | OH#7 | 0: Not a Frame Synchronization Byte (Default)<br>1: Frame Synchronization Byte (FSB) |
| 8 | OH#8 | 0: Not a Frame Synchronization Byte (Default)<br>1: Frame Synchronization Byte (FSB) |
| 7 | OH#9 | 0: Not a Frame Synchronization Byte (Default)<br>1: Frame Synchronization Byte (FSB) |
| 6 | OH#10 | 0: Not a Frame Synchronization Byte (Default)<br>1: Frame Synchronization Byte (FSB) |
| 5 | OH#11 | 0: Not a Frame Synchronization Byte (Default)<br>1: Frame Synchronization Byte (FSB) |

TABLE 2-continued

Frame Synchronization Byte Locations Register

|   |       |                                          |
|---|-------|------------------------------------------|
| 4 | OH#12 | 0: Not a Frame Synchronization Byte (Default) |
|   |       | 1: Frame Synchronization Byte (FSB)      |
| 3 | OH#13 | 0: Not a Frame Synchronization Byte (Default) |
|   |       | 1: Frame Synchronization Byte (FSB)      |
| 2 | OH#14 | 0: Not a Frame Synchronization Byte (Default) |
|   |       | 1: Frame Synchronization Byte (FSB)      |
| 1 | OH#15 | 0: Not a Frame Synchronization Byte (Default) |
|   |       | 1: Frame Synchronization Byte (FSB)      |
| 0 | OH#16 | 0: Not a Frame Synchronization Byte (Default) |
|   |       | 1: Frame Synchronization Byte (FSB)      |

This table defines which of the overhead bytes (1–16) are going to be used as FSBs.

TABLE 3

Frame Synchronization Byte Types

| Bit | 15 | 14 | 13 | 12 | 11 | 10 | 9 | 8 | 7 | 6 | 5 | 4 | 3 | 2 | 1 | 0 |
|-----|----|----|----|----|----|----|---|---|---|---|----|----|----|----|----|----|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 0 | 0 | 0 | 1 | 1 | 1 | 0 | 0 | 0 | 0 | 0 | 0 | 0 | 0 | 0 | 0 |

NOTE:
If an OH byte is not defined to be an FSB in the Decoder Frame Synchronization Byte Locations Register, the corresponding bit in this register has no significance.

| Bit Positions | Function | Description |
|---|---|---|
| 15 | OH#1  | 0: FSB 1 (Default) |
|    |       | 1: FSB 2 |
| 14 | OH#2  | 0: FSB 1 (Default) |
|    |       | 1: FSB 2 |
| 13 | OH#3  | 0: FSB 1 (Default) |
|    |       | 1: FSB 2 |
| 12 | OH#4  | 0:FSB 1 |
|    |       | 1: FSB 2 (Default) |
| 11 | OH#5  | 0: FSB I |
|    |       | 1: FSB 2 (Default) |
| 10 | OH#6  | 0: FSB 1 |
|    |       | 1: FSB 2 (Default) |
| 9  | OH#7  | 0: FSB 1 (Default) |
|    |       | 1: FSB 2 |
| 8  | OH#8  | 0: FSB 1 (Default) |
|    |       | 1: FSB 2 |
| 7  | OH#9  | 0: FSB 1 (Default) |
|    |       | 1: FSB 2 |
| 6  | OH#10 | 0: FSB 1 (Default) |
|    |       | 1: FSB 2 |
| 5  | OH#11 | 0: FSB 1 (Default) |
|    |       | 1: FSB 2 |
| 4  | OH#12 | 0: FSB 1 (Default) |
|    |       | 1: FSB 2 |
| 3  | OH#13 | 0: FSB 1 (Default) |
|    |       | 1: FSB 2 |
| 2  | OH#14 | 0: FSB 1 (Default) |
|    |       | 1: FSB 2 |
| 1  | OH#15 | 0: FSB 1 (Default) |
|    |       | 1: FSB 2 |
| 0  | OH#16 | 0: FSB 1 (Default) |
|    |       | 1: FSB 2 |

TABLE 4

Decoder Framing Controls

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Check to go In-Frame | | | | Check to go Out-of-Frame | | | | Unused | | | FSB Errors Allowed | | | | |
| Mode | rw | rw | rw | rw | rw | rw | rw | rw | rw | rw | rw | rw | rw | rw | rw | rw |
| Default | 0 | 0 | 1 | 0 | 0 | 1 | 0 | 0 | 0 | 0 | 0 | 0 | 1 | 0 | 0 | 0 |

| Bit Positions | Function | Description |
|---|---|---|
| 15:12 | Check to go In-Frame | Number of correct consecutive FSB groups required to go In-Frame. (Default value = 2) |
| 11:8 | Check to go Out-of-Frame | Number of incorrect consecutive FSB groups required to go Out-of-Frame. (Default value = 4) |
| 7:5 | Unused | |
| 5:0 | FSB Errors Allowed | The total number of erred bits allowed in a group of FSBs to still consider a match. (Default value = 8). This number is used regardless of the synchronization state (In-Frame or Out-of-Frame). |

Table 4 sets the synchronization thresholding parameters.

A system and method have been provided that illustrate the advantages of providing programmable FSB bit error rates for the recognition of received frames. The advantage of this invention is the ability to fully customize the synchronization methodology, to optimize robustness to noise and synchronization time. The invention specifically illustrates an example using different FSB values, programmable numbers of FSBs, programmable gain synchronization, programmable lose synchronization parameters, and programmable bit error tolerance within the FSBs themselves. However, the invention is not limited to an particular BER selection, or any specific framing structure. The invention permits users to create different networks that are logically separated from each other so that receivers can easily distinguish between different data sources. Other variations and embodiments of the invention will occur to those skilled in the art.

We claim:

1. In an apparatus for receiving a multidimensional digital frame structure including a plurality of frames, a method for synchronizing frames based upon a selected bit error rate of frame synchronization bytes, the method comprising:
 accepting a command for selecting a bit error rate for frame synchronization bytes;
 selecting a bit error rate in response to the command;
 receiving a frame with an overhead section having a predetermined number of frame synchronization bytes; and
 synchronizing the frame if the bit error rate of the frame synchronization bytes is less than or equal to the selected bit error rate; otherwise,
 not synchronizing the frame.

2. The method of claim 1 wherein selecting the bit error rate includes selecting an average bit error rate.

3. The method of claim 2 wherein receiving a frame includes receiving an overhead section including a first plurality of frame synchronization bytes; and
 wherein selecting an average bit error rate includes selecting an average bit rate for the first plurality of frame synchronization bytes in each frame.

4. The method of claim 2 wherein receiving a frame includes receiving a plurality of frames in a superframe; and
 wherein selecting an average bit error rate includes selecting an average bit error rate for the frame synchronization bytes across a span of a superframe.

5. The method of claim 2 wherein receiving a frame includes receiving a plurality of frames in a plurality of superframes; and
 wherein selecting an average bit error rate includes selecting an average bit error rate for the frame synchronization bytes across a span of a plurality of superframes.

6. The method of claim 1 further comprising:
 accepting a bit error rate selection byte with a second plurality of bits; and
 wherein selecting the bit error rate includes selecting a bit error rate in response to the bit error rate selection byte, in the range from zero to the second plurality of bit values.

7. The method of claim 1 wherein selecting a bit error rate includes independently selecting a bit error rate for each frame synchronization byte.

8. The method of claim 1 wherein selecting a bit error rate includes selecting a first bit error rate and a second bit error rate.

9. The method of claim 8 wherein selecting a bit error rate includes selecting a first error rate in a first frame and a second error rate in a second frame.

10. In an apparatus for receiving a multidimensional digital frame structure including a plurality of frames, a method for synchronizing frames based upon a selected bit error rate of frame synchronization bytes, the method comprising:
 accepting a command for selecting a quantity of frame synchronization bytes;
 selecting a quantity of frame synchronization bytes in response to the command;
 accepting a command for selecting a bit error rate for frame synchronization bytes;
 selecting an average bit error rate in response to the command;
 receiving a frame with an overhead section having a predetermined number of frame synchronization bytes; and
 synchronizing the frame if the average of the bit error rates of a quantity of frame synchronization bytes in the frame equal to the selected quantity of frame synchronization bytes is less than or equal to the selected average bit error rate; otherwise, not synchronizing the frame.

11. In an apparatus for receiving a multidimensional digital frame structure including a plurality of frames, a method for synchronizing frames based upon a selected bit error rate of frame synchronization bytes, the method comprising:

accepting a command for selecting frame synchronization bytes;

accepting a command for selecting a bit error rate for frame synchronization bytes;

selecting a bit error rate for each frame synchronization byte selected in response to the command;

receiving a frame with an overhead section having a predetermined number of frame synchronization bytes;

selecting frame synchronization bytes in the frame in response to the command for selecting frame synchronization bytes; and synchronizing the frame if the bit error rate of each selected frame synchronization byte is less than or equal to the bit error rate selected for the frame synchronization byte; otherwise, not synchronizing the frame.

* * * * *